(12) United States Patent
Bryant

(10) Patent No.: US 6,199,283 B1
(45) Date of Patent: Mar. 13, 2001

(54) IMPLEMENT FOR HOLDING AND/OR CORING VEGETABLES AND/OR FRUITS DURING PREPARATION OF THE SAME

(76) Inventor: Roger L. Bryant, 6513 E. Sierra Morena, Mesa, AZ (US) 85215

( * ) Notice: Subject to any disclaimer, the term of this patent is extended or adjusted under 35 U.S.C. 154(b) by 0 days.

(21) Appl. No.: 09/532,716

(22) Filed: Mar. 22, 2000

(51) Int. Cl.$^7$ .................. B26B 3/04; A47J 25/00
(52) U.S. Cl. ............... 30/113.3; 30/113.1; 30/279.2; 99/594
(58) Field of Search ............... 30/113.1, 113.3, 30/174, 279.2, 279.6, 322; 7/110, 112, 113; 99/594, 494; D7/401.2; 269/53

(56) References Cited

U.S. PATENT DOCUMENTS

| | | | |
|---|---|---|---|
| D. 108,495 | * 2/1938 | Hess | D7/401.2 |
| 112,312 | * 3/1871 | Beal | 30/279.2 |
| D. 248,609 | 7/1978 | Fischer . | |
| 294,362 | * 3/1884 | Brock | 30/279.2 |
| 339,542 | * 4/1886 | Gates | 30/279.6 |
| D. 397,921 | 9/1998 | Joergensen . | |
| 604,965 | * 5/1898 | Cartwright | 7/112 |
| 917,472 | * 4/1909 | Moneuse | 30/322 |
| 1,787,683 | 1/1931 | Innes . | |
| 2,300,311 | 10/1942 | Polk, Sr. et al. . | |
| 2,312,283 | 2/1943 | Polk, Sr. et al. . | |
| 2,313,714 | 3/1943 | Polk, Sr. et al. . | |
| 2,881,816 | 4/1959 | Batt . | |
| 3,762,308 | 10/1973 | Greene et al. . | |
| 3,956,825 | 5/1976 | Ness . | |
| 4,073,060 | * 2/1978 | Hendricks | 30/279.2 |
| 4,457,222 | * 7/1984 | Finkel | 99/494 |
| 4,831,922 | 5/1989 | Cogan . | |
| 4,982,499 | 1/1991 | Fortin . | |
| 4,998,467 | 3/1991 | Kovach . | |
| 5,394,790 | 3/1995 | Smith . | |
| 5,794,349 | 8/1998 | Kelley . | |
| 6,082,253 | * 7/2000 | Ridler | 99/594 |

\* cited by examiner

Primary Examiner—Hwei-Siu Payer
(74) Attorney, Agent, or Firm—John D. Lister

(57) ABSTRACT

An implement for holding and/or coring vegetables and fruits, during the preparation of the vegetables and fruits, includes a shaft for impaling a vegetable or fruit while the vegetable or fruit is peeled, sliced, etc., and a handle for holding the implement and coring a vegetable or fruit. The shaft has an external surface with projecting ribs along the length of the shaft for retaining an impaled vegetable or fruit on the shaft while the vegetable or fruit is being prepared and preferably, is made of a polymeric material to help keep cutting instruments from being dulled by contact with the shaft during use. The handle has projections on either side of the shaft for penetrating a vegetable or fruit to keep the vegetable or fruit from rotating when being held on the shaft and a pair of diametrically opposed blades, for coring a vegetable or fruit, which are spaced from each other to define a space therebetween for containing a core when the handle is being used to core a vegetable or fruit. A sheath can also be included for encasing the shaft when the shaft is not in use.

14 Claims, 1 Drawing Sheet

IMPLEMENT FOR HOLDING AND/OR CORING VEGETABLES AND/OR FRUITS DURING PREPARATION OF THE SAME

BACKGROUND OF THE INVENTION

The present invention relates to an implement for use in the preparation of vegetables and fruits for cooking and eating and, in particular, to an implement which can be used to both hold a vegetable or fruit while the vegetable or fruit is being peeled, sliced, etc. or to core a vegetable or fruit.

During the preparation of vegetables and fruits, such as but not limited to potatoes, carrots or other tubers and apples, peaches or other fruit, either at home or in a restaurant for cooking or eating, frequently the vegetables or fruits are peeled, sliced and/or cored with a kitchen knife or other sharp cutting instrument. When the vegetables or fruits are directly held by hand during the peeling, slicing and/or coring of the vegetables or fruits, the hand of the person holding the vegetable or fruit can easily be accidentally cut with the cutting instrument. In addition, to minimize such accidents, the person is likely to proceed at a slower pace than otherwise possible if the person were not trying to avoid injury.

As shown by the following patents, various implements have been used in connection with the preparation of vegetables and fruits. U.S. Pat. No. 1,787,683, discloses a fork for holding a pineapple or other fruit while the fruit is being prepared. U.S. Pat. Nos. 2,300,311, 2,312,283, and 2,313,714, disclose forks for holding citrus fruits which include circular arrangements of tines for penetrating the fruit. U.S. Pat. No. 2,881,816, discloses an implement with a handle, a flat bar twisted by barely half a turn, and prongs for holding tubers.

While these holding implements are useful in the preparation of vegetables and fruit for cooking or eating, there has remained a need for a holding implement which: securely retains a vegetable or fruit in place on the holding implement; protects the user from cuts or other injuries from a knife or other cutting instrument used in the preparation of the vegetable or fruit; protects the sharp metal edge of a knife or other cutting instrument from being unduly dulled by being drawn across or otherwise coming into contact with the holding implement; and can be used to core a fruit or vegetable.

SUMMARY OF THE INVENTION

The implement of the present invention for holding and/or coring vegetables and fruit, during the preparation of the vegetables and fruit, provides an inexpensive solution to all of the above discussed problems. The implement of the present invention includes: a shaft for impaling a vegetable or fruit while the vegetable or fruit is peeled, sliced, etc.; and a handle for holding the implement and coring a fruit or vegetable. The shaft has an external surface with projecting rib(s), a continuous thread or a series of annular spaced apart ribs, extending for the entire length or for substantially the entire length of the shaft to retain an impaled vegetable or fruit on the shaft while the fruit or vegetable is being prepared, e.g. peeled and/or sliced. The projecting rib(s) extend at an angle of 45° or less to a plane that is perpendicular to the longitudinal centerline of the implement so that the ribs better retain a vegetable or fruit on the shaft. The external surface of the shaft is made of a polymeric material that is not as hard as the stainless steel cutting blades of the standard knives and other cutting instruments normally used in kitchens and restaurants. The formation of the shaft surface from such a polymeric material helps to keep the blades of the cutting instruments from being unduly dulled by contact with the shaft during preparation of a vegetable or fruit, especially when the vegetable or fruit is being sliced while held on the shaft.

The handle of the implement of the present invention has projections on either side of the shaft, spaced radially outward from the shaft, and extending from a base of the handle in the same general direction as the shaft for penetrating a vegetable or fruit to keep the vegetable or fruit from rotating when being held on the shaft. The handle includes a pair of blades for coring a vegetable or fruit which extend in a direction opposite to the projection of the shaft from the handle base. The blades are diametrically opposed and spaced from each other to define a space therebetween for containing a core when the handle is being used to core a fruit or vegetable, e.g. a seeded fruit or vegetable.

DESCRIPTION OF THE PREFERRED EMBODIMENTS

Figure 1:
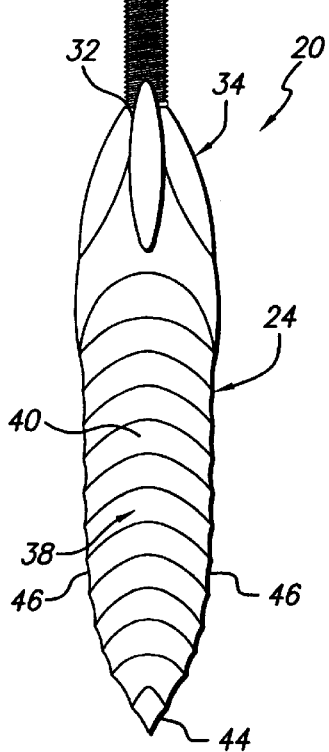
FIG. 1 is a top schematic view of the vegetable and fruit holding and coring implement of the present invention.
Figure 2:
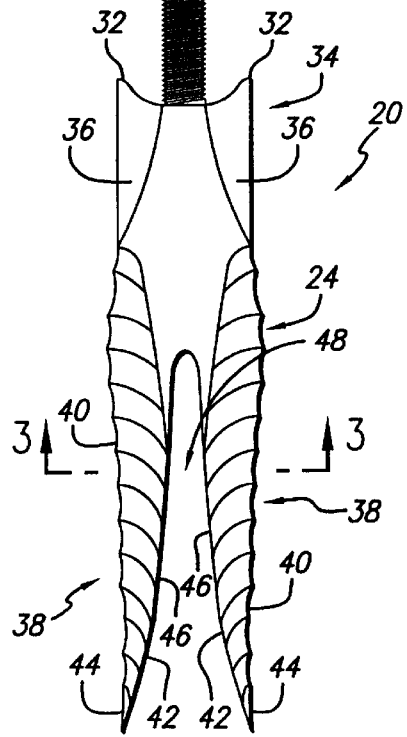
FIG. 2 is a side schematic view of the vegetable and fruit holding and coring implement of the present invention.
Figure 3:
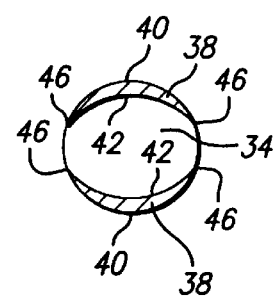
FIG. 3 is a transverse schematic cross section of the vegetable and fruit holding and coring implement of the present invention, taken substantially along lines 3—3 of FIG. 2.

As shown in FIGS. 1–3, the implement 20 of the present invention includes: a shaft 22 for impaling a vegetable or fruit while the vegetable or fruit is peeled, sliced, shredded, etc.; and a handle 24 for holding the implement 20 and coring a fruit or vegetable. Typically, the shaft 22 has a length ranging from about one and one-half inches to about four inches and the handle 24 has a length ranging from about three and one-half inches to about five and one-half inches. A shaft less than one and one-half inches long may not effectively retain certain vegetables and fruits on the shaft and a shaft longer than four inches does not appreciably enhance the retention of fruits and vegetables on the shaft. Preferably, the shaft 22 is from about two and one-half to about three and one-half inches in length. While not restricted to such a length, a handle 24 ranging in length from about three and one-half to about five and one-half inches is good for gripping and for coring vegetables and fruits.

Preferably, the shaft 22 and the handle 24 are a molded, single piece of thermosetting polymeric material, e.g. nylon six, that has a hardness less than stainless steel and other metals commonly used in kitchen knives and other kitchen cutting implements so that stainless steel cutting blades drawn across or otherwise coming into contact with the implement 20 will not be unduly dulled. While not preferred, it is also contemplated that the implement 20 could have a metal core that is coated with a thermosetting polymeric material, such as nylon six, that has a hardness less than that of stainless steel.

Figure 4:
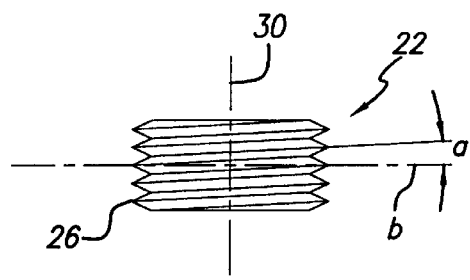
FIG. 4 is an enlarged schematic view of a portion of the vegetable and fruit holding shaft of the implement which is threaded.
Figure 5:
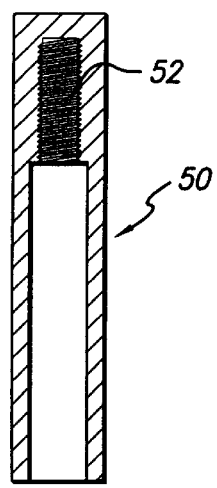
FIG. 5 is an enlarged schematic view of a portion of the vegetable and fruit holding shaft of the implement which has a series of annular ribs.
Figure 5:
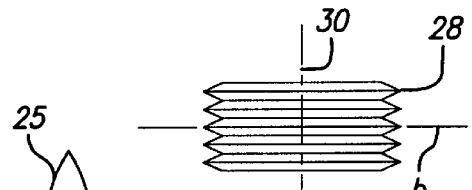

Preferably, the shaft 22 has a pointed or conical shaped free end 25 that facilitates the insertion of the shaft 22 into a vegetable or fruit and a diameter, for the reminder of its length, between about 3/16 of an inch and about 3/8 of an inch and, more preferably, a diameter of about 1/4 of an inch. The shaft 22 of the implement 20 has an external surface with projecting rib(s), a continuous thread 26 or a series of annular spaced apart ribs 28, extending for greater than half the length and, preferably, for the entire length or for substantially the entire length of the shaft 22 to retain an impaled vegetable or fruit on the shaft 22 while the fruit or vegetable is being prepared. As schematically shown in FIGS. 4 and 5, the projecting rib(s) 26 or 28 extend at an angle "a" or have a degree of slope "a" of 45° or less to a plane "b" that is perpendicular to the longitudinal centerline 30 of the implement 20 (shaft 22 and handle 24) so that the ribs 26 or 28 better retain a vegetable or fruit on the shaft 22. As mentioned above, preferably, the external surface of the shaft 22, including the rib(s) 26 or 28, is made of a polymeric material that is not as hard as the metal cutting blades, e.g. stainless steel knife blades, of the cutting instruments normally used in kitchens and restaurants to help keep the blades of the cutting instruments from being unduly dulled by contact with the shaft 22 during preparation of a vegetable or fruit.

Preferably, the shaft 22 has a continuous rib or thread 26 extending for the entire length or for substantially the entire length of the shaft 22 at an angle or degree of slope "a" of 45° or less to the perpendicular plane "b". Preferably, the thread 26 has from about eight to about twenty eight Unified Fine or Coarse threads [American National (Unified) threads] per inch. In the alternative, the shaft 22 may have a series of spaced apart annular ribs 28 extending in planes or having a degree of slope "a" of 45° or less to the perpendicular plane "b" and preferably, extending in planes parallel to or substantially parallel to the perpendicular plane "b" (i.e. perpendicular to or substantially perpendicular to the longitudinal centerline 30 of the shaft and implement). Preferably, there are from about eight to about twenty eight annular ribs 28 per inch and, preferably, the ribs have a size approximating that of a Unified Fine or Coarse thread [American National (Unified) thread]. The diameter of the shaft 22, set forth, above is the outside diameter of the threads 26 or ribs 28.

The handle 24 of the implement 20 preferably has projections 32 on either side of the shaft 22 that are spaced radially outward from the shaft 22 and extend from a base 34 of the handle 24 in the same general direction as the shaft 22. These projections 32 are for penetrating a vegetable or fruit impaled on the shaft 22 to keep the vegetable or fruit from rotating when being held on the shaft 22. The base 34 also includes a pair of finger gripping flange portions 36 for gripping the implement 20 when coring a vegetable or fruit.

The handle 24 includes a pair of blades 38 for coring a vegetable or fruit. The blades 38 extend from the base 34 of the handle 24 in a direction generally parallel to the longitudinal centerline 30 of the shaft and the handle and in a direction opposite to the projection of the shaft 22 from the handle base 34. Preferably, the external diameter of the handle 24 along the lengths of the convex exterior surfaces of the blades 38 is about one to about one and one half inches. The blades 38 are diametrically opposed to each other and spaced from each other to define a space therebetween for containing a core when the handle 24 is being used to core a fruit or vegetable. While the convex exterior surfaces 40 of the of the blades 38 have a generally constant diameter throughout their length (as shown, the surfaces of the blades are ribbed for better gripping), preferably, the concave interior surfaces 42 of the blades 38 diverge from each other from the base 34 to the free ends 44 of the blades. The blades 38 are the same length and the free ends 44 of the blades are tapered to facilitate the insertion of the blades into a vegetable or fruit for coring. The blades 38 each have a pair of lateral cutting edges 46, extending the entire lengths of or for substantially the entire lengths of the blades 38, which enable the blades 38 to easily penetrate a vegetable or fruit and be easily rotated about one quarter of a turn within the vegetable or fruit to cut a core out of the vegetable or fruit for extraction from the vegetable or fruit. With the blades 38, including the opposed lateral cutting edges 46 of the blades 38, spaced from each other, there is a gap 48 between the blades, as shown in FIG. 2, extending generally for the lengths of the blades 38. Once a core has been removed from a vegetable or fruit, the gap 48 between the blades 38 permits a core to be easily removed from the coring handle 24 with a user's fingers or a fork, knife or other kitchen utensil.

In one embodiment of the present invention, the shaft 22 is provided with a removable tubular sheath 50 which is about the same length as the shaft and fits over the shaft 22 when the shaft is not in use. The sheath 50 can also function as a grip when the blades 38 of the handle 24 are being used to core a vegetable or fruit. Where the shaft 22 has a continuous thread 26, the tubular sheath 50 can be provided with a mating internal thread 52 at the closed end of the sheath which, as shown in FIG. 1, extends at least part of the length of the sheath 50 and enables the sheath 50 to be threaded onto and off of the shaft 22. The mating thread 52 can be pre-formed (molded) into the sheath 50 when the sheath is formed or a stepped down portion of the sheath 50 at its closed end can be made of a softer polymeric material than the shaft 22 and the shaft 22 can be threaded into the stepped down portion of the tubular sheath to tap the mating threads 52 into the sheath 50, e.g by the purchaser of the product. The tubular sheath 50 can also be made with an internal diameter that causes an interference fit between the thread 26 or ribs 28 of the shaft 22 and the interior surface of the tubular sheath 50 whereby the sheath is held on the shaft 22 by friction.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An implement for use in the preparation of the vegetables and fruits, comprising:

a shaft for impaling a vegetable or fruit and a first handle for holding the implement; the shaft and the first handle having a common longitudinal centerline;

the shaft having a length of at least one and one-half inches and an external diameter between about three sixteenths and three eights of an inch; the shaft having an external surface with projecting rib means thereon extending for at least one half the length of the shaft to retain an impaled vegetable or fruit on the shaft while the vegetable or fruit is being prepared; the rib means having a degree of slope to a plane perpendicular to the longitudinal centerline of the shaft ranging from 0° to 45°; the external surface of the shaft being made of a polymeric material to help keep cutting instruments from being unduly dulled by contact with the shaft during preparation of a vegetable or fruit; and the first handle being integral with the shaft; the first handle having a base at a first end of the first handle from which the shaft projects along the common longitudinal centerline; the base of the first handle having projections on either side of the shaft, spaced radially outward from the shaft, and extending from the base in the same general direction as the shaft for penetrating a vegetable or fruit to keep the vegetable or fruit from rotating when being held on the shaft.

2. The implement for use in the preparation of vegetables and fruits according to claim 1, wherein:

the shaft and the first handle are one piece and consist essentially of the polymeric material.

3. The implement for use in the preparation of vegetables and fruits according to claim 1, wherein:

the rib means is a thread having from about eight to about twenty eight threads per inch; and the rib means extends for substantially the entire length of the shaft.

4. The implement for use in the preparation of vegetables and fruits according to claim 1, wherein:

the rib means is a series of spaced apart annular ribs extending in planes substantially perpendicular to the longitudinal centerline of shaft; there are from about eight to about twenty eight annular ribs per inch; and the rib means extends for substantially the entire length of the shaft.

5. The implement for use in the preparation of vegetables and fruits according to claim 2, wherein:

the shaft has a length ranging from about one and one-half inches to about four inches and the first handle has a length ranging from about three and one-half inches to about five inches.

6. The implement for use in the preparation of vegetables and fruits according to claim 1, wherein:

the first handle includes a first blade and a second blade for coring a vegetable or fruit; the first and second blades extend from the base at the first end of the first handle in a direction generally parallel to the longitudinal centerline of the shaft and the first handle and in a direction opposite to the projections of the base; the blades being diametrically opposed and spaced from each other to define a space therebetween for containing a core when the first handle is being used to core a vegetable or fruit.

7. The implement for use in the preparation of vegetables and fruits according to claim 6, wherein:

the rib means is a thread having from about eight to about twenty eight threads per inch.

8. The implement for use in the preparation of vegetables and fruits according to claim 6, wherein:

the rib means is a series of spaced apart annular ribs extending in planes substantially perpendicular to the longitudinal centerline of shaft; and there are from about eight to about twenty eight annular ribs per inch.

9. The implement for use in the preparation of vegetables and fruits according to claim 6, wherein:

the blades are the same length; the blades have free ends which are tapered; the blades each have a pair of lateral cutting edges extending substantially the lengths of the blades; and the blades have generally convex external surfaces intermediate the lateral edges for forming a grip and concave internal surfaces intermediate the lateral edges for receiving a core of a vegetable or fruit.

10. The implement for use in the preparation of vegetables and fruits according to claim 9, wherein:

the projections on the base for preventing a vegetable from rotating include finger gripping portions for providing a finger grip when using the first handle for coring.

11. The implement for use in the preparation of vegetables and fruits according to claim 10, wherein:

the shaft and the handle are one piece and consist essentially of the polymeric material.

12. The implement for use in the preparation of vegetables and fruits according to claim 11, wherein:

the shaft has a length ranging from about one and one-half inches to about four inches and the first handle has a length ranging from about three and one-half inches to about five inches.

13. The implement for use in the preparation of vegetables and fruits according to claim 12, wherein:

the implement includes a sheath for covering the shaft when the shaft is not in use and for providing a second handle when the blades of the first handle are being used for coring a vegetable or fruit.

14. The implement for use in the preparation of vegetables and fruits according to claim 13, wherein:

the rib means on the shaft is a thread and the sheath is internally threaded to thread onto and off of the shaft thread.

* * * * *